United States Patent
Jean-Denis et al.

(10) Patent No.: US 7,660,955 B2
(45) Date of Patent: Feb. 9, 2010

(54) NODE POLLING IN CONSISTENCY GROUP FORMATION

(75) Inventors: Pierre-Fortin Jean-Denis, Tucson, AZ (US); Gail Andrea Spear, Tucson, AZ (US); Robert Francis Bartfai, Tucson, AZ (US); Sonny Earl Williams, Tucson, AZ (US); Nicolas Marc Clayton, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 11/292,842

(22) Filed: Dec. 1, 2005

(65) Prior Publication Data

US 2007/0130213 A1    Jun. 7, 2007

(51) Int. Cl.
*G06F 12/00* (2006.01)
(52) U.S. Cl. ..................... 711/162; 707/200
(58) Field of Classification Search ............... 711/162
See application file for complete search history.

(56) References Cited

U.S. PATENT DOCUMENTS

| | | | |
|---|---|---|---|
| 5,504,861 A | 4/1996 | Crockett et al. | |
| 5,615,329 A | 3/1997 | Kern et al. | |
| 2004/0260899 A1* | 12/2004 | Kern et al. | 711/162 |
| 2004/0260976 A1* | 12/2004 | Ji et al. | 714/31 |
| 2005/0071588 A1* | 3/2005 | Spear et al. | 711/162 |
| 2005/0071710 A1* | 3/2005 | Micka et al. | 714/6 |
| 2006/0106747 A1 | 5/2006 | Bartfai et al. | |

* cited by examiner

*Primary Examiner*—Reginald G Bragdon
*Assistant Examiner*—Aracelis Ruiz
(74) *Attorney, Agent, or Firm*—William K. Konrad; Konrad Raynes & Victor LLP

(57) ABSTRACT

Provided are a method, system, deployment and program for managing data transfer in consistency group formation. In one embodiment, nodes are periodically polled to determine traffic conditions. An estimated drain time for a node such as the most congested node, for example, is compared to a drain time limit and if within a vicinity of the drain time limit, operations switch to a consistency group formation mode. Other embodiments are described and claimed.

20 Claims, 7 Drawing Sheets

Relationship Record

NODE POLLING IN CONSISTENCY GROUP FORMATION

BACKGROUND

Disaster recovery systems typically address two types of failures, a sudden catastrophic failure at a single point in time or data loss over a period of time. To assist in recovery of data updates, a copy of data may be provided at a remote location. Such dual or shadow copies are typically made as the application system is writing new data to a primary storage device. International Business Machines Corporation (IBM), the assignee of the subject patent application, provides the following systems for maintaining remote copies of data at a secondary site, Extended Remote Copy (XRC) and Peer-to-Peer Remote Copy (PPRC). These systems provide a method for the continuous mirroring of data to a remote site to failover to during a failure at the primary site from which the data is being continuously mirrored. Such data mirroring systems can also provide an additional remote copy for non-recovery purposes, such as local access at a remote site. The IBM XRC and PPRC systems are described in the IBM publication "DFSMS/MVS Version 1 Remote Copy Administrator's Guide and Reference; Document Number SC35-0169-03© Copyright IBM Corp. 1994, 1997), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD. In the IBM XRC environment, the application system writing data to the primary volumes includes a sysplex timer which provides a time-of-day (TOD) value as a time stamp to data writes. The host system time stamps data sets when writing such data sets to volumes in the primary DASD. The integrity of data updates is related to insuring that updates are done at the secondary volumes in the volume pair in the same order as they were done on the primary volume. In XRC and other prior art systems, the cross systems common time stamp provided by the system on behalf of the application program determines and maintains the logical sequence of data updates across any number of data volumes on any number of storage systems. In many application programs, such as database systems, certain writes cannot occur unless a previous write occurred; otherwise the data integrity would be jeopardized. Such a data write whose integrity is dependent on the occurrence of a previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. Consistency groups maintain data consistency across volumes and storage devices. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC environment, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

Details of creating and operating data structures in the formation of consistency groups are described in the copending and commonly assigned patent application entitled "METHOD, SYSTEM, AND PROGRAM FOR FORMING A CONSISTENCY GROUP", having Ser. No. 10/676,852, filed Sep. 29, 2003, which patent application is incorporated herein by reference in its entirety. One data structure, an out of synch bitmap, may be used to indicate tracks to be transferred. A storage controller may receive a consistency group formation command to copy consistent data on specified volumes managed by the storage controller to a remote site. In response, the storage controller may queue any further writes while generating a change recording bitmap to keep track of queued writes as well as any subsequent writes after formation of the consistency group is initiated. This mode of operation may be referred to as a "Consistency Group in Progress Mode." In this mode, tracks indicated in the out-of-synch bitmap may be copied to the remote site to create a consistency group.

After the out of synch bitmap is drained such that all the asynchronous remote copy operations indicated in the out of synch bitmap have been completed, a consistency group may have been formed. If so, the mode of operation may switch to a second mode in which subsequent writes may instead be recorded in the out of synch bitmap. Tracks indicated in the out-of-synch bitmap may continue to be copied to the remote site. This mode of operation may be referred to as a "Normal Transfer Mode," for example. In this mode, the change recording bitmap may be merged with the out of synch bitmap, and the change recording bitmap may be discarded. Further, a virtual copy may be performed at the remote site of the volumes consistent as of the time of the storage controller receiving the point-in-time copy command.

In general, all of the bits in the out of synch bitmap are cleared in the Consistency Group in Progress mode before a consistency group is successfully formed. One approach to managing the data transfer in consistency group formation is to impose a fixed time limit on the creation of the consistency group. If the out of synch bitmap is not completely drained before the expiration of the period of time, then the consistency group formation attempt is deemed failed. If so, the mode of operation may be switched from the Consistency Group in Progress Mode to the Normal Transfer Mode. In preparation for the mode switch, the bits of the change recording bitmap may be merged with the out of synch bitmap and any new host writes are recorded in the out of synch bitmap by setting appropriate bits of the out of synch bitmap. As a consequence, tracks from all volumes may be transferred to remote sites as the out of synch bitmap continues to be drained. Thus, a backlog of writes for the next consistency group formation attempt can be reduced or eliminated in some applications.

If the out of synch bitmap is not completely drained after another time limit, another attempt may be made to form a consistency group by switching back to the Consistency Group in Progress Mode. This time limit on duration of the Normal Transfer mode may be dynamically calculated as conditions change as described in copending application Ser. No. 10/987,570, filed Nov. 12, 2004, entitled "DATA TRANSFER MANAGEMENT IN CONSISTENCY GROUP FORMATION".

Having switched back to the Consistency Group in Progress Mode, the storage controller may queue any subsequent writes while generating the change recording bitmap. After generating the change recording bitmap, any queued writes and subsequent writes may be indicated in the change recording bitmap, and tracks indicated in the out-of-synch bitmap may continue to be copied to the remote site. Again, if the out of synch bitmap is not fully drained by the expiration of the associated time period, the consistency group formation may be deemed a failure and the mode of operation may be switched back to the Normal Transfer Mode. After a certain number consistency group attempts are failed (such as five consistency group attempts, for example) due to the draining of the out of synch bitmap exceeding the associated time limit for formation of each consistency group, the time limit may be ignored. As a consequence, the operation mode may remain in the Consistency Group in Progress mode until a consistency group is successfully formed.

To dynamically calculate the time limit for remaining in the Normal Transfer Mode, the number of tracks remaining to be transferred for a particular node such as a server toward creation of the consistency group as indicated by the out of synch bitmap, may be queried a first time and again at a second, subsequent time as the controller leaves the Consistency Group in Progress Mode. In this manner, the rate of change of the number of tracks remaining to be transferred for the particular server may be determined as a function of the change in the number of tracks determined at the first and second times and dividing by the duration of time between the first and second times. An estimated transfer or drain time for each server may be determined by dividing the number of tracks remaining to be transferred for the particular server toward creation of the consistency group as indicated by the out of synch bitmap, by the data transfer rate determined for the particular server. The longest estimated transfer time of the estimated transfer times calculated for each source server may be selected as a transfer time. In addition, the selected transfer time may be multiplied by a constant to provide a dynamically calculated time limit for the Normal Transfer Mode before returning to the Consistency Group in Progress Mode to attempt formation of another consistency group.

SUMMARY OF AN ILLUSTRATED EMBODIMENT

In one embodiment, segments of data identified in a first data structure, are transferred from a source of a plurality of sources to a destination of a plurality of destinations, and the first data structure is updated to indicate a transfer of a segment of data. In accordance with one aspect of the description, in a first mode of operation, the first data structure is updated to indicate additional segments of data to be transferred between the sources and destinations, and a plurality of sources are polled to determine a backlog of each polled source and an estimated drain time for each determined backlog. An estimated drain time may be compared to a predetermined drain time limit, and as a function of the comparison, a switch may be selectively made from the first mode to a second mode of operation. In one embodiment, the second mode may include forming a consistency group, and updating a second data structure instead of the first data structure to indicate additional segments of data to be transferred between the source and destination of a consistency group being formed. Other embodiments are described and claimed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural operational changes may be made without departing from the scope of the present description.

Figure 1:
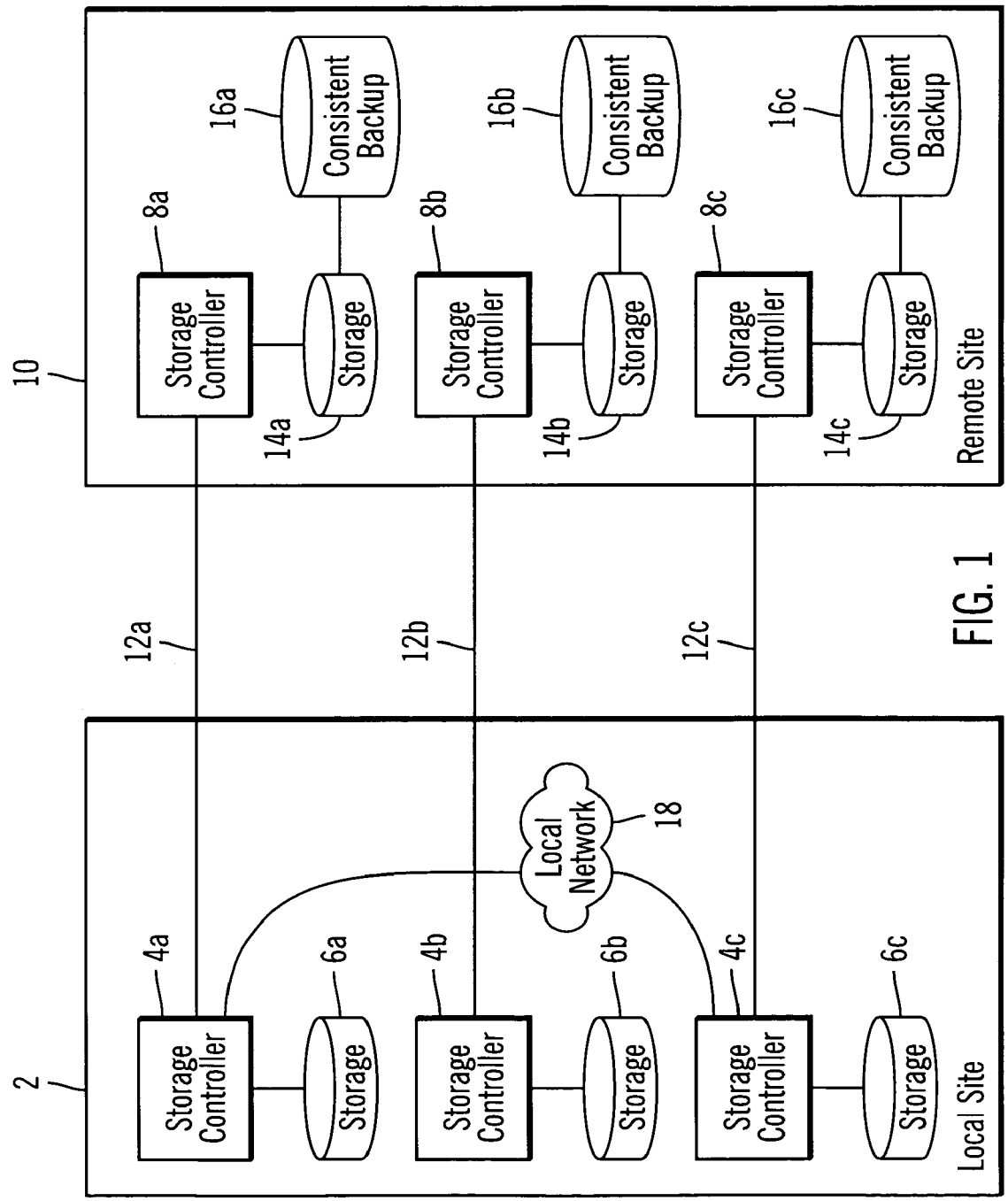
FIG. 1 is a block diagram illustrating a network computing environment in which aspects of the description provided herein may be employed.

FIG. 1 illustrates a network computing environment in which aspects of the described embodiments may be employed. A local site 2 includes storage controllers 4a, 4b, 4c, where each storage controller 4a, 4b, 4c is coupled to an attached storage system 6a, 6b, 6c, respectively. The storage controllers 4a, 4b, and 4c manage Input/Output (I/O) access to volumes in the storage systems 6a, 6b, 6c from host systems (not shown). Each storage controller 4a, 4b, 4c copies data to a corresponding remote storage controller 8a, 8b, 8c at a remote site 10 via connections 12a, 12b, and 12c. The storage controllers 4a, 4b, and 4c transmit data consistent as of point-in-times to the remote storage controllers 8a, 8b, 8c, where the remote storage controllers 8a, 8b, 8c store the data to their respective attached remote storage systems 14a, 14b, 14c. In certain embodiments, the storage controllers 4a, 4b, 4c continuously transmit data to the remote site 10, and at certain instances in time will ensure consistency of the data at the remote site 10. In certain embodiments, the remote site 10 may save a consistency group of data to another storage, such as consistent backup storages 16a, 16b, 16c, to maintain a backup of the consistent data at the remote site 10. After a consistent group of data is transmitted to the remote storage 14a, 14b, 14c, a copy is made from remote storage 14a, 14b, 14c to a respective consistent backup storage 16a, 16b, 16c. Although FIG. 1 illustrates a certain number of components at the sites, such as three storage controllers and storages, the described embodiments may operate with any number of storage controllers and storage systems at the sites.

As explained in greater detail below, in managing data transfers in a consistency group formation, nodes such as the primary volumes of each volume pair may be polled on a periodic basis, for example, to identify the most congested node, for example. A determination may be made as to whether the estimated drain time for a particular node, such as the most congested node, is within the vicinity of a time limit imposed for the formation of a consistency group. If so, the mode of operation may be switched to a consistency group in progress mode to form a consistency group. Otherwise, periodic polling may continue until it is subsequently determined that the estimated drain time for the most congested node, is within the vicinity of the time limit for formation of a consistency group. A watchdog timer may be imposed upon the periodic polling such that if the watchdog timer expires prior to the polling determining that the estimated drain time for the most congested node, is within the vicinity of the time limit for formation of a consistency group, operations may again be switched to a consistency group in progress mode to form a consistency group. It is believed that operations managed in this manner can significantly improve backlog reduction and thereby increase the chances of a successful consistency group formation. Additional or different benefits or aspects may be achieved, depending upon the particular application As used herein, a data segment may be a single track, multiple tracks, a portion of a track or any other unit of data suitable for transfer. The remote site 10 may be hundreds or thousands of miles from the local site 2. The connections 12a, 12b, 12c between pairs of storage controllers may comprise a dedicated line, such as a dedicated fiber optical network or connection maintained by a long distance telecommunication carrier, long distance fiber optic connection having channel extenders, or extend through a network, such as a Storage Area Network (SAN), Local Area Network (LAN), the Internet, and Intranet, etc.

Host systems (not shown) at the local site 2 may perform Input/Output (I/O) operations with respect to volumes in the storage systems 6a, 6b, and 6c. The host systems may communicate with storage controllers 4a, 4b, 6c via any network or connection known in the art. The storage controllers 4a, 4b, 4c at the local site may have certain consistency group relationships with respect to the volumes managed by the storage controllers. For instance, one storage controller may be designated as a master, e.g., 4c, and others designated as subordinates, e.g., 4a, 4b. Volumes controlled by controllers designated as subordinates may be managed by the storage controller designated as the master. In this way, one master storage controller may manage remote copy operations for specified volumes for subordinate controllers designated as subordinates for a particular master.

The storage controllers 4a, 4b, 4c, 8a, 8b, 8c further include a processor complex and may comprise any storage controller or server known in the art, such as the IBM Enterprise Storage Server (ESS)®, 3990 Storage Controller, etc. (Enterprise Storage Server is a registered trademark of IBM). The storage systems 6a, 6b, 6c, 14a, 14b, 14c, 16a, 16c, and 16c may comprise an array of storage devices, such as Just a Bunch of Disks (JBOD), Redundant Array of Independent Disks (RAID) array, tape drive, virtualization device, etc.

Figure 2:
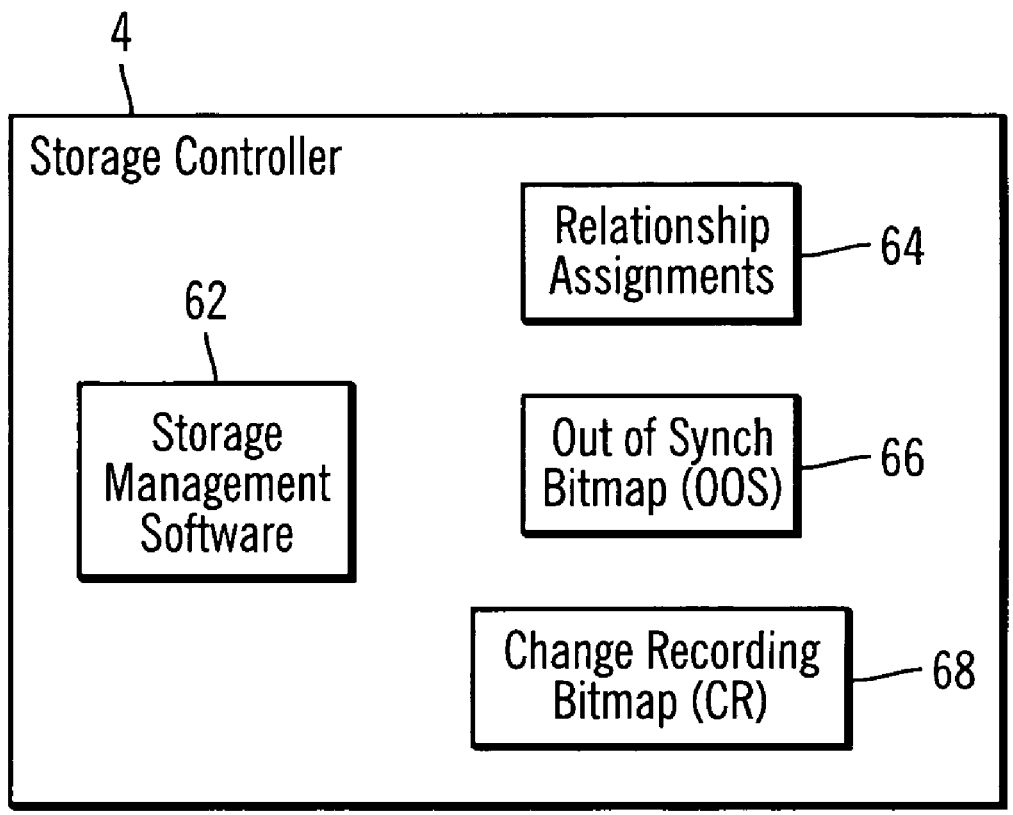
FIG. 2 illustrates an arrangement of a storage controller in accordance with one embodiment.

FIG. 2 illustrates programs and information that may be included in a storage controller 4 at the local site 2, e.g., storage controllers 4a, 4b, 4c, including storage management software 62, relationship assignment information 64, an out-of-synch bitmap (OOS) 66, and a change recording (CR) bitmap 68. The storage management software 62 may include code to allow for remote copying of data, such as the code included in the IBM PPRC Extended Distance program, to allow for mirroring of data over relatively short and long distances. Further details of the IBM PPRC extended distance program are described in the IBM publication "IBM Total-Storage Enterprise Storage Server PPRC Extended Distance", having document no. SG24-6568-00 (Copyright IBM, June 2002), which publication is incorporated herein by reference in its entirety. The relationship information 64 maintained by the storage management software 62 includes information for each volume (or portion of a volume) on the storage 6a, 6b, 6c, respectively, subject to a consistency group relationship. For consistency group environments, such as shown in FIG. 1, the relationship information 64 further indicates whether the storage controller is a master for a consistency group relationship or whether a volume in the attached storage is a subordinate in a consistency group relationship. A storage controller designated as the master storage controller, e.g., 4c, manages consistency group copy operations for designated volumes in its attached storage, e.g., 6c, or volumes in other storage systems, e.g., 6a, 6b, managed by other storage controllers, e.g., 4a, 4b, designated as subordinates. Thus, the master-subordinate designation may be made on a volume-by-volume basis. In alternative embodiments, the master-subordinate designation may be made at a sub-volume level. Different volumes in one storage controller may be assigned as subordinates to different point-in-time copy relationships. Thus, a master storage controller may control the point-in-time copy for volumes distributed in the storage systems managed by different storage controllers.

The local storage controllers 4a, 4b, 4c may communicate over a local network 18, which may comprise direct connections or a switched network. Alternatively, the storage controllers 4a, 4b, 4c may communicate over a link 12a, b, c if the links also extend through a network at the local site 2.

In further embodiments, the mirroring of data and consistency group management may occur on a session basis. A session may be defined as including multiple volumes that may be referenced using a session name when the session is started. A consistency group relationship may be assigned to a session so that relationship would apply to all volumes in the session. All volumes defined within a session would be included in the same consistency group.

Figure 3:
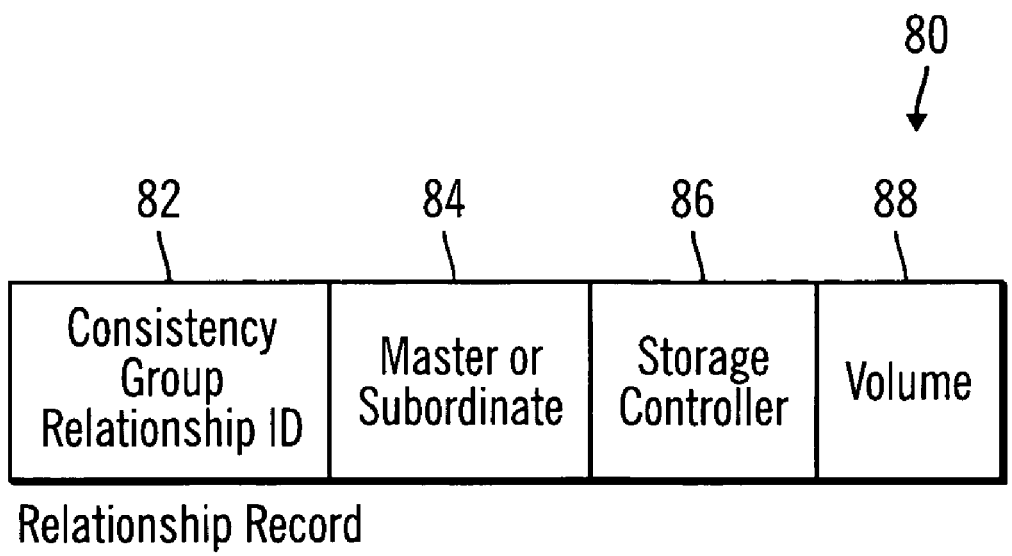
FIG. 3 illustrates relationship information in accordance with one embodiment.

The relationship information 64 may include a plurality of relationship assignments, one for each volume for which the storage controller is designated as a master or subordinate. FIG. 3 illustrates information included in a relationship assignment 80.

A relationship identification field 82 indicates an ID of a consistency group copy relationship because there may be many relationships, each assigned a group of volumes, across the storage controllers 4a, 4b, 4c. Thus, a storage controller 4a, 4b, 4c may be a master for multiple consistency group relationships, or have volumes that are subordinates in different relationships. The master-subordinate field 84 indicates whether the assignment is for a master or subordinate relationship. If the master-subordinate indicator 84 specifies "master", then that storage controller, e.g., 4c, including that assignment 80, is a master in the consistency group relationship identified in field 82 for the volume indicated in the volume information 88 managed by the storage controller, e.g., 4a or 4b, indicated in the storage controller information 86. Likewise, if the master-subordinate indicator 84 specifies "subordinate", then the volume in the attached storage, e.g., 6a or 6b, indicated in the volume information 88, is a subordinate in the relationship identified in field 82 to the master storage controller, e.g., 4c, indicated in the storage controller information 86. A master storage controller, e.g., 4c, may be assigned a subordinate volume that is in storage, e.g., 6a, 6b, attached to another storage controller, e.g., 4a, 4b, or is in the storage, e.g., 6c, attached to the master storage controller, e.g., 4c. Thus, a master may be assigned subordinate volumes in the attached storage and/or in storage systems attached to other storage controllers. Further, a storage controller may be assigned as a master for volumes in the attached storage and/or storages managed by other storage controllers and, at the same time, include volumes that are assigned as subordinates to a master, where that master may be the storage controller itself or another storage controller.

Further, the assignment information 64 for a master storage controller would include a relationship record 80 for each subordinate volume on a subordinate storage controller, where the subordinate storage controller and volume would be indicated in fields 86 and 88, respectively. The relationship information may be maintained in a different arrangement and format than shown in FIG. 3, and may be maintained in any data structure known in the art, such as a text or formatted text file, database, etc.

An out-of-synch bitmap 66 includes a bit for each track that the subordinate storage controllers are to copy over to the corresponding remote storage. Thus, the out-of-synch bitmap 66 indicates a backlog of tracks waiting to be copied. During normal copy operations, any writes to a storage controller are recorded in the out-of-synch bitmap (OOS) 66 and then copied over to the remote storage. The change recording bitmap 68 includes a bit for each track to which an update is received during the formation of a consistent set of data. Further, the storage controllers 4a, 4b, 4c may maintain one set of these bitmaps for each volume, or alternatively maintain one set of bitmaps 66 and 68 for a group of volumes in the attached storage 6a, 6b, 6c. Although the bitmaps of the illustrated embodiment are described as representing a track with a bit, it is appreciated that one or more bits of a bitmap may represent other data portions or segments such as one or more blocks, pages, bytes, etc as well as a plurality of tracks.

Figure 4:
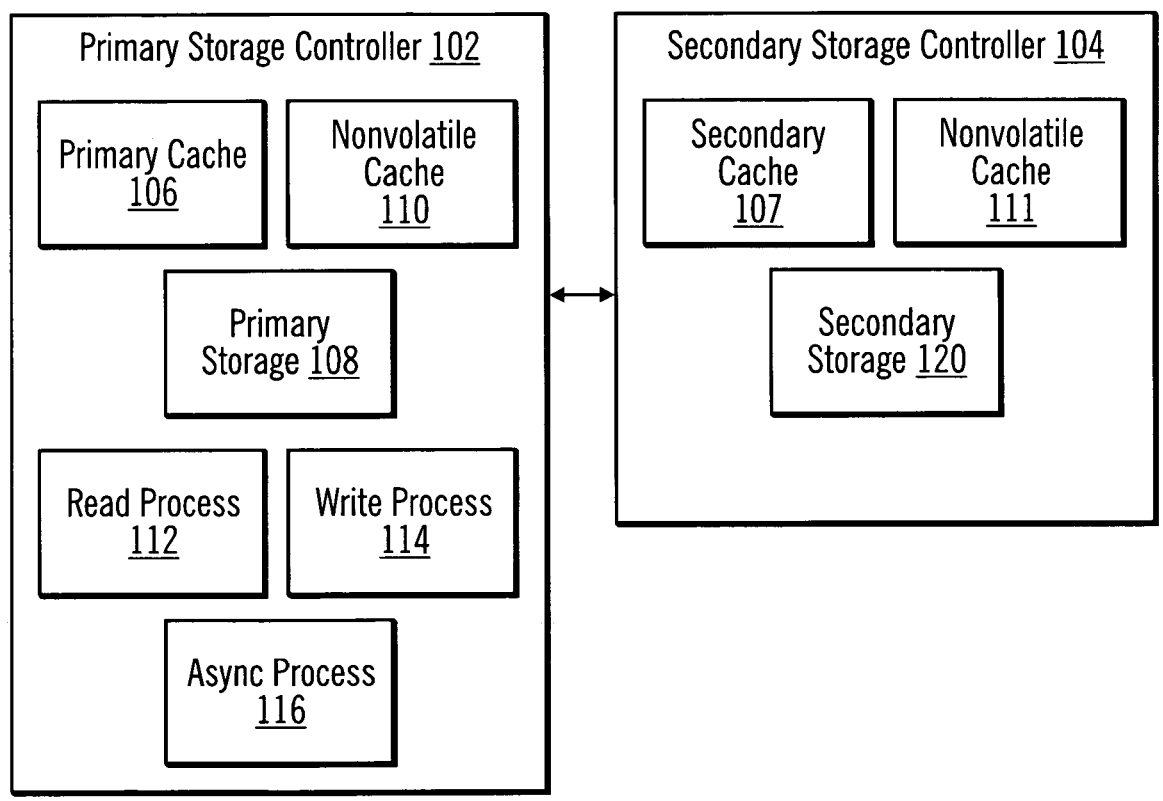
FIG. 4 illustrates components within the storage controllers of FIG. 1 in accordance with one embodiment.

In certain embodiments, the storage controllers run a background process to copy any tracks indicated as updated in their out-of-synch bitmaps to the remote storage. This process continues in the subordinate controllers even after the formation of a consistency group is initiated and the change recording bitmap created. FIG. 4 illustrates further details of the storage controllers 4a, 4b, 4c, where each is referred to a primary storage controller 102 that copies data to a secondary storage controller 104, such as storage controllers 8a, 8b, 8c, which receive the data. The primary storage controller 102 includes a primary cache 106 in which updates to tracks in the attached storage 108 managed by the primary storage controller 102, such as storages 6a, 6b, 6c, are maintained until written to the attached primary storage 108 (i.e., the tracks are destaged). Additionally, the primary storage controller 102 includes a nonvolatile cache 110. The non-volatile cache 110 may be, for example, a battery-backed up volatile memory, to maintain a non-volatile copy of data updates and other information. The secondary storage controller 104 similarly may include a secondary cache 107 and a nonvolatile cache 111.

The primary storage controller 102 includes a read process 112 for reading data, and a write process 114 for writing data. The primary storage controller 102 also includes an async process 116 for transferring data from the primary storage controller 102 to remote storage, such as storage at the secondary storage controller 104. In certain embodiments, the async process 116 may perform synchronization of data for an asynchronous PPRC Extended Distance service. In such cases, the async process 116 runs continuously for the PPRC Extended Distance service. In certain embodiments, there may be multiple async processes (e.g., one async process for each volume on primary storage 108 for PPRC Extended Distance). In certain embodiments, the read process 112, write process 114, and async process 116 are embodied in firmware. The secondary storage controller 104 writes the data received from the primary storage controller 102 to secondary storage 120, such as storages 14a, 14b, 14c (FIG. 1). The different processes 112, 114, and 116 may be embodied in storage management software 62.

Additional details of creating and operating OOS and CR data are described in the copending and commonly assigned patent application entitled "METHOD, SYSTEM, AND PROGRAM FOR FORMING A CONSISTENCY GROUP", having Ser. No. 10/676,852, filed Sep. 29, 2003, which patent application is incorporated herein by reference in its entirety.

In one example of the formation of a consistency group, a primary storage controller 102 may receive a consistency group formation command to copy specified volumes managed by the primary storage controller 102 to a remote site. In response, the primary storage controller 102 may queue any further writes while generating the change recording bitmap 68. After generating the change recording bitmap 68, any queued writes and subsequent writes may be indicated in the change recording bitmap 68, and tracks indicated in the out-of-synch bitmap 66 may be copied to the remote site. This mode of operation may be referred to as a "Consistency Group in Progress Mode."

After the OOS 66 is drained such that all the asynchronous remote copy operations indicated in the OOS 66 have been completed, subsequent writes may instead be recorded in the OOS 66 and tracks indicated in the out-of-synch bitmap 66 may continue to be copied to the remote site. This mode of operation may be referred to as a "Normal Transfer Mode," for example. In this mode, the change recording bitmap 68 may be merged with the OOS 66, and the change recording bitmap 68 may be discarded. Further, a virtual copy may be performed at the remote site of the volumes. In the illustrated embodiment, the primary storage controller 102 sends a point-in-time copy command to the secondary controller after the drain is complete but before returning to the normal mode. It is appreciated that a copy may be made at other times, depending upon the particular application.

In general, all of the bits in the OOS 66 are cleared before a consistency group is successfully formed. It is appreciated that a temporary load imbalance may create a situation in which a relative few volumes in the consistency group have many bits set in the OOS 66, indicating many tracks to be transferred from those source volumes. Conversely, a number of source volumes may have relatively few bits set in the OOS 66, indicating few tracks to be transferred from those source volumes. As a consequence, the bits for many volumes may be cleared from the OOS 66 for a relatively long period of time before all the bits for a few source volumes which are heavily loaded with tracks are transferred within the consistency group. If new tracks to be transferred are being indicated in the change recording bitmap 68 instead of the OOS 66, a large number of volumes can be prevented from transferring any tracks while awaiting the completion of the transfer of tracks for the more heavily loaded volumes. Thus, host writes being collected in the change recording bitmap 68 can create a large backlog of writes to be transferred during creation of the next consistency group. As a consequence, the number of tracks to be transferred during the formation of the next consistency group may be substantially increased.

One approach to managing the data transfer in consistency group formation is to impose a time limit on the creation of the consistency group. If the OOS 66 is not completely drained before the expiration of the period of time, then the consistency group formation attempt is deemed failed. In accordance with one aspect of the present description, if the consistency group formation attempt fails, the mode of operation may be switched from the Consistency Group in Progress Mode to a Modified Transfer Mode which is similar to the Normal Transfer Mode. Like the Normal Transfer Mode, the bits of the change recording bitmap 68 may be merged with the OOS 66 and any new host writes are recorded in the OOS 66 by setting appropriate bits of the OOS 66. As a consequence, tracks from all volumes may be transferred to remote sites as the OOS 66 continues to be drained. Thus, a large backlog of writes for the next consistency group formation attempt can be reduced or eliminated in some applications.

However, in the Modified Transfer Mode, the various source volumes may also be periodically polled to identify the most congested node, for example. A determination may be made as to whether the estimated drain time for a particular node, such as the most congested node, is within the vicinity of a time limit imposed for the formation of a consistency group. If so, the mode of operation may be switched to a consistency group in progress mode to form a consistency group. Otherwise, polling may continue until it is subsequently determined that the estimated drain time for the most congested node, is within the vicinity of the time limit for formation of a consistency group. A watchdog timer may be imposed upon the polling such that if the watchdog timer expires prior to the polling determining that the estimated drain time for the most congested node, is within the vicinity of the time limit for formation of a consistency group, operations may again be switched to a consistency group in progress mode to form a consistency group.

It is believed that by periodically polling the nodes, accommodations may be readily made in response to changing conditions. For example, the profile of the most congested node may be updated on a frequent basis. Thus, if the location of the most congested node changes, such will be noted by the polling and appropriate action taken. Similarly, the system can respond to changes in the drain rate of the most congested node, by, for example, switching modes of operation either more frequently or less frequently, depending upon those changing conditions. Still further, the effect of short-lived transient conditions upon the modes of operation may be limited since subsequently polling can reveal the disappearance of the transient conditions. Other features and benefits may be achieved in addition to or instead of those described herein.

Figure 5A:
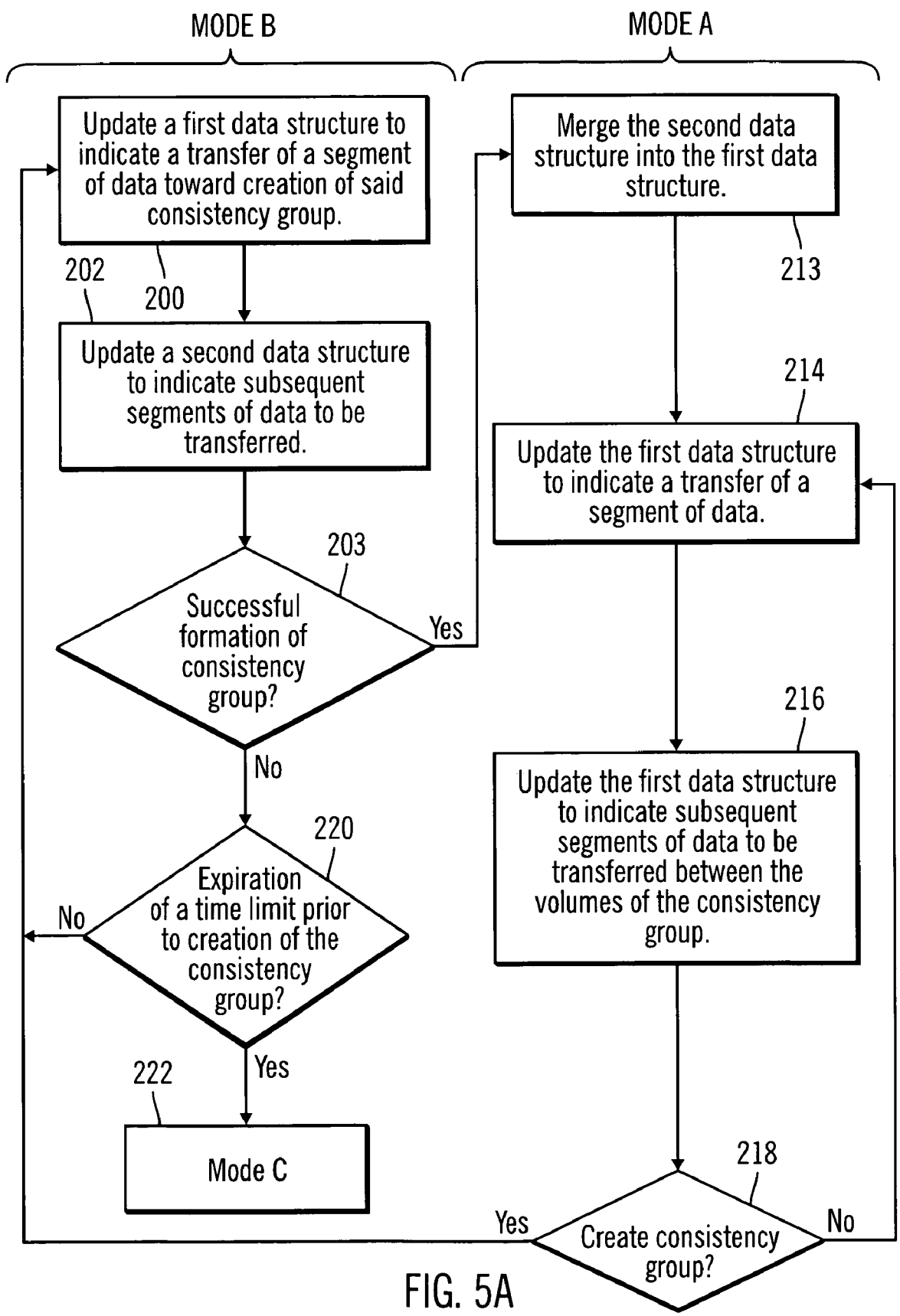
FIGS. 5a, 5b illustrate operations performed by storage controllers to manage data transfers toward creation of consistency groups in accordance with one embodiment.
Figure 5B:
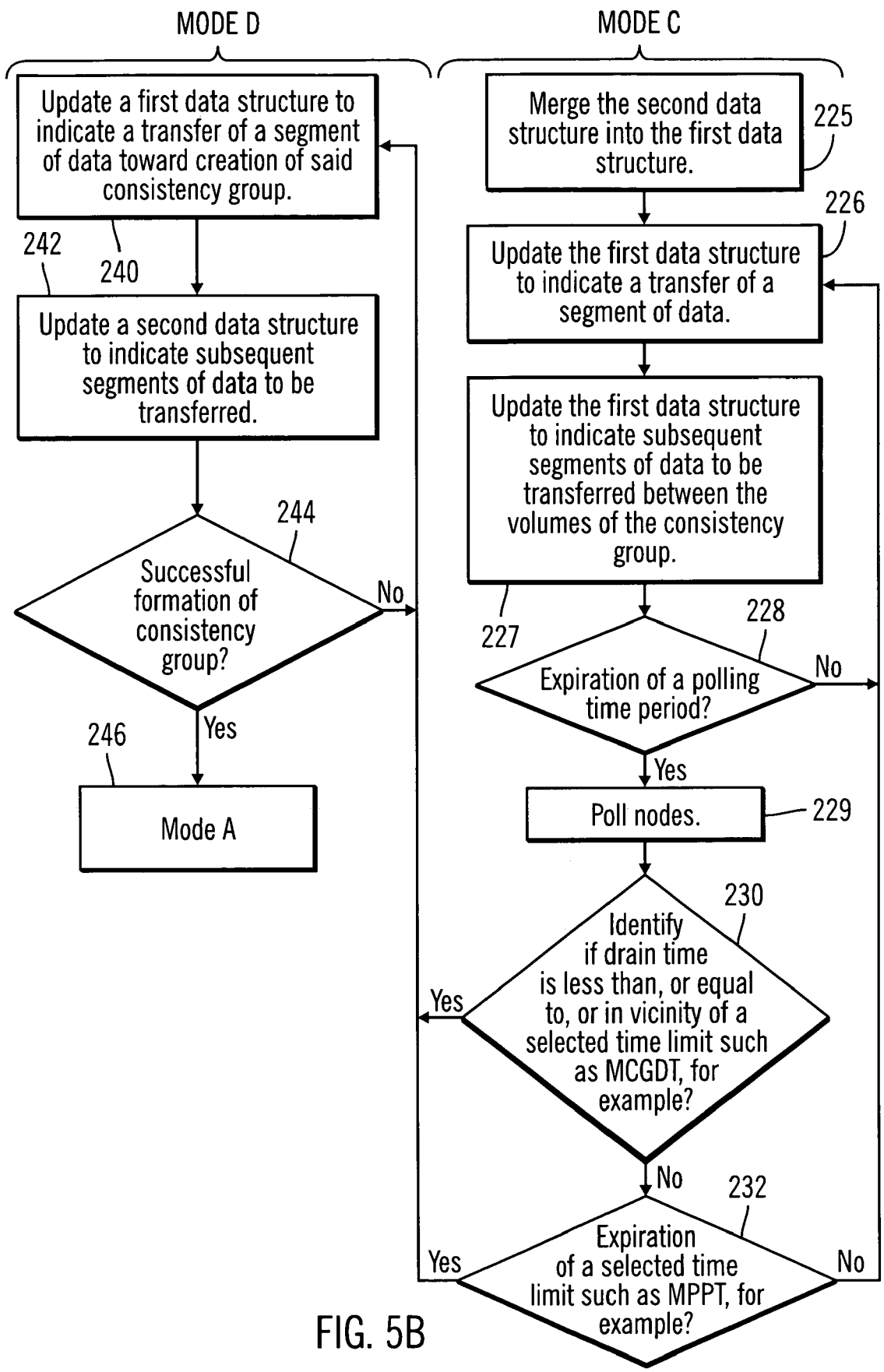

In the example of FIGS. 5a, 5b, four modes of operation are depicted. It is appreciated that a larger or smaller number of modes may be utilized, depending upon the particular application. In one mode, designated mode A, the operations may be similar to a Normal Transfer Mode, for example. In another mode, designated mode B, the operations may be similar to a Consistency Group In Progress mode, for example. In both these modes, segments of data are being transferred from source volumes to destinations volumes identified for a consistency group. The segments which are to be transferred toward formation of the consistency group are identified by a first data structure, such as the OOS bitmap 66, for example. In this example, the OOS 66 has bits which may be set to indicate that particular segments are to be transferred to form a consistency group.

In one operation of mode B, which may be a Consistency Group In Progress mode, for example, a first data structure, such as the OOS 66, for example, is updated (block 200, FIG. 5a) to indicate successful transfer of a segment of data, such as a data track, for example, toward the creation of a consistency group. In this example, the OOS 66 has bits which may be reset or cleared to indicate that particular segments have been successfully transferred. A second data structure, such as the change recording bitmap 68, for example, is updated (block 202) to indicate additional segments of data to be transferred. These additional segments may be, for example, data segments which the host has subsequently written to one or more of the consistency group source volumes after the formation of the consistency group was initiated. In this example, the change recording bitmap 68 has bits which may be set to indicate subsequently written segments. As discussed below, in this example, data segments indicated by the change recording bitmap 68 will eventually be transferred to the destination volumes of the consistency group after the consistency group has been successfully formed or upon a failure of the consistency group to successfully form.

As the first data structure such as the OOS 66 is drained, a determination (block 203) is made as to whether the consistency group has been successfully created. If so, operations switch back to mode A and the second data structure, which in this example is a change recording bitmap 68, is merged (block 213) into the first data structure, that is, the OOS 66, in this example. Thus, all data segments including the segments written to the source volumes subsequent to the initiation of the consistency group formation, which are to be transferred for the volumes of the failed consistency group, may be indicated by bits of the OOS 66 in this mode.

As data segments as identified by the first data structure (the OOS 66 in this example) continue to be transferred, the first data structure may be updated (block 214) to indicate the successful transfer of a data segment. In this example, a bit of the out-of-synch bitmap 66 may be cleared to indicate each successful transfer. Thus, the OOS 66 provides an indication of the backlog of tracks to be drained for formation of a consistency group. In mode A (a Normal Transfer mode in this example), the first data structure (the OOS 66 in this example) is also updated (block 216) to indicate any additional data segments subsequently written to the source volumes, which are to be transferred as well. In this example, a bit of the out-of-synch bitmap 66 may be set to indicate each subsequent data segment written by the host after the merger of the second data structure into the first data structure.

As data segments are transferred, a determination may be made (block 218) as to whether a consistency group should be created in Mode B. A variety of factors may be utilized to make this determination. For example, it may be determined to create consistency groups on a periodic basis. Also, such a determination may be made based upon the duration of time since the last successful creation of a consistency group. Other factors may be used as well.

If a consistency group is not to be created in Mode B, data segments as identified by the first data structure (the OOS 66 in this example) continue to be transferred, the first data structure continues to be updated (block 214) to indicate the successful transfer of each data segment and the first data structure continues to be updated (216) to indicate any subsequent data segments written to the source volumes, which are to be transferred as well.

If it is determined (block 218) that a consistency group should be created, the mode of operation may be switched back to another mode, such as mode B (the Consistency Group in Progress mode in this example) which includes the operations of blocks 200-203. Once it is determined (block 203) that a consistency group has successfully formed, operations may switch back to mode A which is the Normal Transfer Mode, in this example.

However, in this embodiment, a time limit is imposed on the creation of the consistency group in Mode B. The time limit for formation of a consistency group may be selected using a variety of techniques. For example, the time limit may be user selected or defined. Alternatively, the time limit for formation of a consistency group may be a dynamically calculated variable which varies in accordance with varying conditions, such as congestion conditions, for example. If the OOS 66 is not completely drained before the expiration of the period of time, then the consistency group formation attempt is deemed failed. Thus, the time limit for formation of a consistency group may be referred to herein as a Maximum Consistency Group Drain Time (MCGDT).

If it is determined (block 220) that a predetermined time limit, such as MCGDT, for example, has not yet expired prior to successful creation of a consistency group, operations may continue in mode B (the Consistency Group in Progress mode in this example) which include the operations of blocks 200-203 and 220. In accordance with one aspect of the present description, if it is determined (block 220) that the time limit, such as MCGDT, for example, has expired prior to successful creation of a consistency group, operations may switch to another mode, mode C in this example, which is similar to a Normal Transfer Mode but is modified as explained below. Hence, in this example, mode C is referred to as a Modified Transfer Mode in this embodiment.

As operations switch to mode C, a Modified Transfer Mode in this embodiment, the second data structure, which in this example is a change recording bitmap 68, is merged (block 225) into the first data structure, that is, the OOS 66, in this example, in a manner similar to the Normal Transfer Mode, or Mode A, in this example. Thus, all data segments including the segments written to the source volumes subsequent to the initiation of the consistency group formation, which are to be transferred for the volumes of the failed consistency group, may be indicated by bits of the OOS 66 in this mode.

As data segments as identified by the first data structure (the OOS 66 in this example) continue to be transferred, the first data structure may be updated (block 226) to indicate the successful transfer of a data segment. In this example, a bit of the out-of-synch bitmap 66 may be cleared to indicate each successful transfer. In mode C (a Modified Transfer mode in this example), the first data structure (the OOS 66 in this example) is also updated (227) to indicate any additional data segments subsequently written to the source volumes, which are to be transferred as well. In this example, a bit of the out-of-synch bitmap 66 may be set to indicate each subsequent data segment written by the host after the merger of the second data structure into the first data structure.

As data segments are transferred, periodic time intervals may be measured. Thus, upon expiration (block 228) of a selected time period (such as five seconds, for example), nodes such as the primary volumes of each volume pair may be polled (block 229). In the illustrated embodiment, the period of time between the polling of the nodes may be fixed or variable. This interval may be user selected or dynamically calculated. In the illustrated embodiment, a default value, such as five seconds, for example, is provided if the user does not select a value for the period of time between the polling of the nodes.

In another operation, a determination is made to identify (block 230) a drain time for a particular polled node, which is within a range of a selected time limit, such as the Maximum Consistency Group Drain Time (MCGDT) for example. In the illustrated embodiment, the primary volumes are periodically polled to determine the most congested node or primary volume. It is appreciated that, in other applications, other nodes or primary volumes may be identified. For example, a group of the more congested primary volumes may be identified. Other criteria may be used for node identification.

In this example, for the node determined to be the most congested, an estimation is made of the drain time to drain its updated tracks as indicated in the OOS 66 to its peer secondary node. This estimated drain time for the most congested node is compared to in the illustrated embodiment, the MCGDT and if it is either less than or equal to the MCGDT or within a vicinity, that is, within a certain range of the MCGDT, operations may switch to another mode, Mode D, in this example. A consistency group may be formed in Mode D as explained below.

In the illustrated embodiment, the MCGDT may be 30 seconds, for example and the vicinity of MCGDT may be within 5 seconds of the MCGDT, for example. It is appreciated that other periods and other ranges or vicinities may be selected, depending upon the particular application.

In the illustrated embodiment, polling of each primary node comprises two or more consecutive queries which are spaced apart in time, such as a one second spacing, for example. For each polled node, data is collected in response to each query. In the illustrated embodiment, the number of remaining updated tracks as indicated by the OOS 66 is noted for the node being queried. An offload or drain rate may be calculated by dividing the change in the number of remaining updated tracks between consecutive queries, by the period of time between the consecutive queries. An estimated drain time for each queried node may then be calculated based upon the number of remaining updated tracks and the drain rate determined for the particular node. A most congested node may be identified by, for example, determining the node having the highest ratio of the number of remaining updated tracks as indicated by the OOS 66, to the offload rate or drain time calculated for that node. It is appreciated that other criteria may be used to identify a congested node or a "most" congested node. It is further appreciated that the number of queries to each node during polling, the spacing between queries, and the information solicited in each query, may vary, depending upon the particular application.

If it is determined (block 230), that the estimated drain time for the most congested node is less than or equal to a time limit such as MCGDT or within a vicinity, that is, within a certain range of a time limit such as the MCGDT, operations may switch to Mode D to form a consistency group as explained below. On the other hand, if the estimated drain time for the most congested node is not within a vicinity, that is, within a certain range of the MCGDT, a further determination (block 232) may be made as to whether another timer such as a watchdog timer, has expired. This timer may set a time limit on failures of the polling to identify an estimated drain time for the most congested node which is within a vicinity, that is, within a certain range of a time limit such as the MCGDT. The time limit for the polling to identify an estimated drain time for the most congested node which is less than or equal to a time limit such as the MCGDT, or which has come within the vicinity of a time limit such as MCGDT, may be referred to herein as the Maximum Polling Phase Time (MPPT). In the illustrated embodiment, the maximum polling phase time may be fixed or variable and may be user selected or dynamically calculated. In the illustrated embodiment, a default value, such as 1800 seconds, for example, is provided if the user does not select a value for the period of time between the polling of the nodes. It is appreciated that other durations of time may be selected.

Upon expiration of the time limit or maximum polling phase time of operation 232, operations may switch to Mode D to force the formation of a consistency group as explained below. If the time limit of operation 232 has not expired, operations may continue in Mode C including operations 225-230.

Mode D is similar to Mode B in that both modes create consistency groups. However, Mode D of the illustrated embodiment lacks a time limit, such as the time limit imposed in operation 230 of Mode B. As a consequence, the formation of a consistency group may be forced until successfully completed. It is appreciated that other embodiments of Mode D may have a time limit such as, for example, a longer time limit than the time limit MCGDT for Mode B, to increase the prospects for successful creation of a consistency group relative to Mode B.

Thus, in a manner similar to Mode B, which may be a Consistency Group In Progress mode, for example, the first data structure, such as the OOS 66, for example, is updated (block 240, FIG. 5b) to indicate successful transfer of a segment of data, such as a data track, for example, toward the creation of a consistency group. As previously mentioned, the OOS 66 has bits which may be reset or cleared to indicate that particular segments have been successfully transferred. The second data structure, such as the change recording bitmap 68, for example, is updated (block 242) to indicate additional segments of data to be transferred. These additional segments may be, for example, data segments which the host has subsequently written to one or more of the consistency group source volumes after the formation of the consistency group was initiated. In this example, the change recording bitmap 68 has bits which may be set to indicate subsequently written segments. In this example, data segments indicated by the change recording bitmap 68 will eventually be transferred to the destination volumes of the consistency group after the consistency group has been successfully formed or upon a failure of the consistency group to successfully form.

As the first data structure such as the OOS 66 is drained, a determination (block 244) is made as to whether the consistency group has been successfully created. If so, operations switch back to mode A (FIG. 5a) and the second data structure, which in this example is a change recording bitmap 68, is merged (block 213) into the first data structure, that is, the OOS 66, in this example. Thus, all data segments including the segments written to the source volumes subsequent to the initiation of the consistency group formation, which are to be transferred for the volumes of the failed consistency group, may be indicated by bits of the OOS 66 in this mode.

On the other hand, if a consistency group has not been successfully formed, operations may continue in mode D (the Consistency Group in Progress mode in this example) which include the operations of blocks 240-244 until a consistency group is successfully formed.

Figure 6:
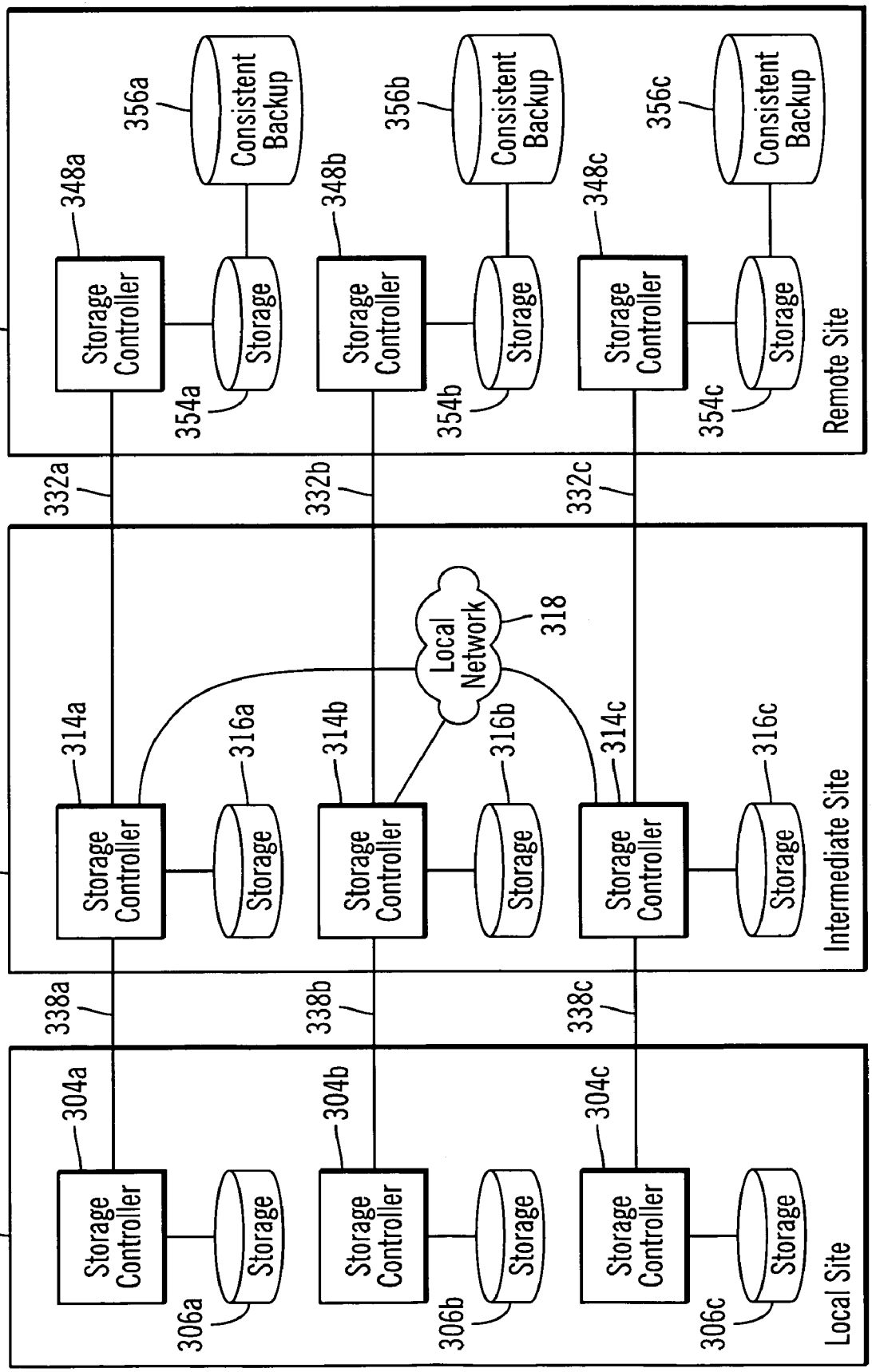
FIG. 6 illustrates an additional network computing environment in which aspects of the description provided herein may be employed.

FIG. 6 illustrates a four volume solution, where the storage controllers 314a, 314b, 314c at an intermediate site 312 may operate in the same manner as the storage controllers 4a, 4b, and 4c described with respect to FIG. 1 and the components at the remote site 330 may operate as described at the remote site 10 components described with respect to FIG. 1. The local site 302 and intermediate site 312 may be situated in a relatively close geographical area, such as a same building, different buildings in a same campus, a same city, etc. The connections 338a, 338b, 338c between the storage controllers at the local 302 and intermediate 312 sites may comprise separate dedicated lines or the connections may extend through a switched network, such as a Storage Area Network (SAN), Local Area Network (LAN), the Internet, an Intranet, etc. The remote site 330 may be hundreds or thousands of miles from the local 302 and intermediate 312 sites. The connections 332a, 332b, 332c may comprise the connections 12a, 12b, 12c described above with respect to FIG. 1, comprising long distance connections.

In the embodiment of FIG. 6, hosts would direct I/O requests to the storage controllers 304a, 304b, 304c managing storage systems 306a, 306b, 306c at the local site 302. The storage controllers 304a, 304b, 304c at the local site 302 would then synchronously copy any writes to the storage controllers 314a, 314b, 314c at the intermediate site 312. In certain embodiments, the host writes would not complete until the local storage controllers 304a, 304b, 304c synchronously copied the data to the intermediate site 312. The master storage controllers, e.g., 314c, would then asynchronously manage consistency group formation at the remote site 330 as described with respect to FIGS. 5a, 5b according to remote copy policies embodied in the master storage controllers at the intermediate site 312.

). The remote storage controllers 348a, 348b, 348c store the data to their respective attached remote storage systems 354a, 354b, 354c. In certain embodiments, the remote site 330 may save a consistency group of data to another storage, such as consistent backup storages 356a, 356b, 356c, to maintain a backup of the consistent data at the remote site 330.

ADDITIONAL EMBODIMENT DETAILS

The described techniques to form consistency groups may be embodied as a method, apparatus, deployment or article of manufacture using standard programming and/or engineering techniques to produce software, firmware, hardware, or any combination thereof. The term "article of manufacture" as used herein refers to code or logic embodied in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are utilized may further be accessible through a transmission media or from a file server over a network. In such cases, the article of manufacture in which the code is embodied may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any information bearing medium known in the art.

The described embodiments were described with respect to the IBM Asynchronous PPRC computing environment. However, the described embodiments for maintaining consistency could be applied to maintain consistency in other computing and vendor environments and using other data copying protocols and programs than described herein.

In described embodiments, the master and storage controller processes were executed in a distributed computing environment. In alternative embodiments one or more of the subordinate processor operations may be executed in the same machine or platform in which the master storage controller processes are executed.

In certain embodiments, data in the storage devices is arranged in volumes. In alternative systems, the storage areas on which data is maintained may be grouped according to storage units other than volumes that are grouped in groupings other than sessions for the purpose of maintaining consistency.

In described embodiments, the storage units designated as the subordinates in the consistency group copy relationship comprised volumes. In alternative embodiments, other storage unit values may be assigned as a subordinate to a master, where such storage units may comprise tracks in a volume, blocks, logical subsystems, logical drives, or any other physical or logical storage unit designation known in the art.

The described operations for forming a consistency group may be used in a critical data environment where high availability is paramount. However, those skilled in the art will appreciate that the point-in-time copy operations described herein may apply to storage systems used for non-critical data where high availability is not absolutely necessary.

In the described embodiments, each storage controller copies data to a corresponding remote storage controller having an attached remote storage system. In alternative embodiments, multiple storage controllers at the local or intermediate site may copy data to one remote storage controller, where a single remote storage controller may receive point-in-time data from multiple local or intermediate storage controllers.

The illustrated logic of FIGS. 5a, 5b shows certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 7:
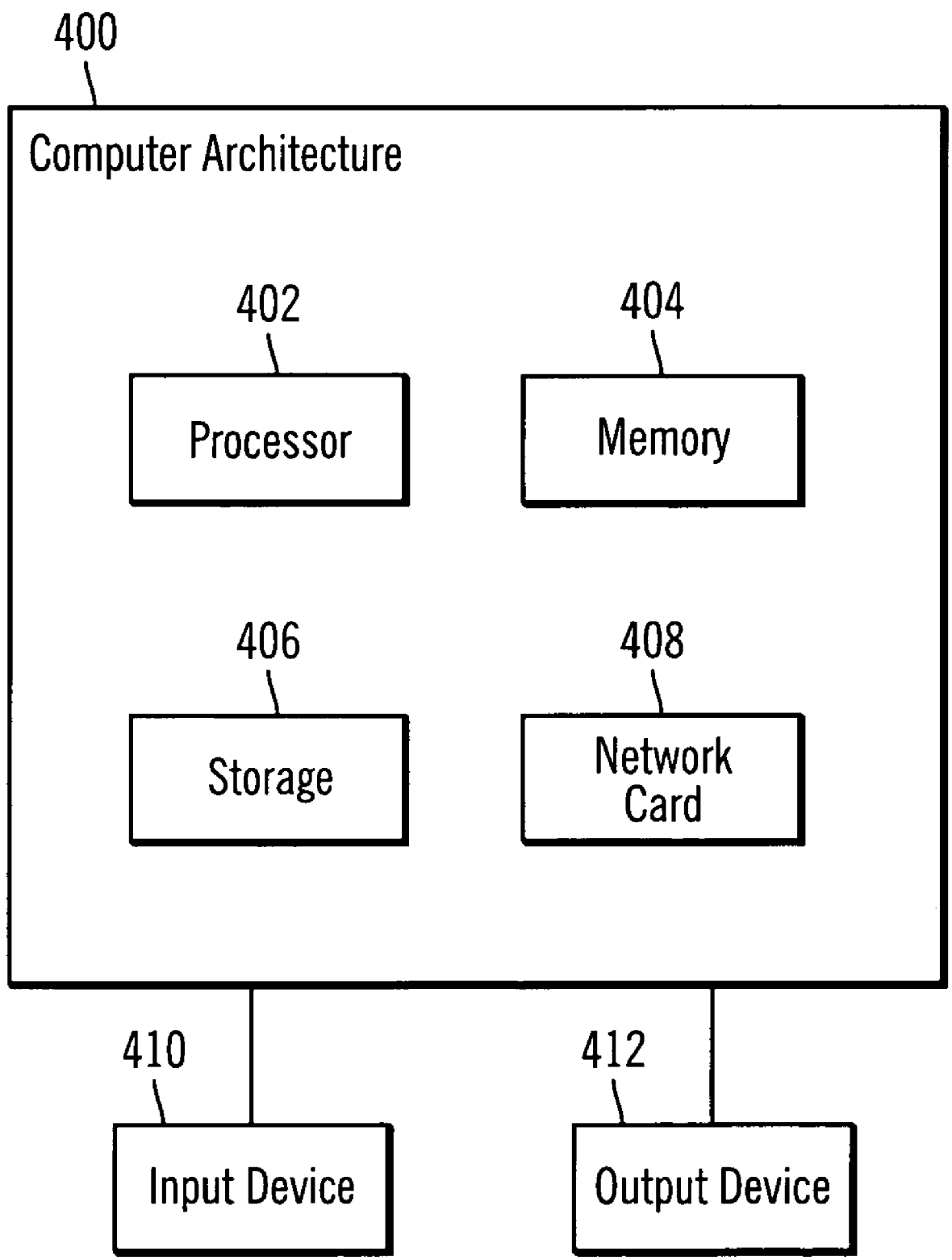
FIG. 7 illustrates an architecture of computing components, such as storage controllers, which may be employed in a network environment, in accordance with one embodiment.

FIG. 7 illustrates one embodiment of a computer architecture 400 of the network components, such as the storage controllers shown in FIGS. 1 and 6. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various embodiments has been presented for the purposes of illustration and description. It is not intended to be exhaustive or to limit the description to the precise form disclosed. Many modifications and variations are possible in light of the above teaching.

What is claimed is:

1. A method of creating a consistency group, comprising:
transferring segments of data identified in a first data structure, from a source of a plurality of sources to a destination of a plurality of destinations;
updating said first data structure to indicate a transfer of a segment of data; and
in a first mode of operation:
updating said first data structure to indicate additional segments of data to be transferred between the sources and destinations;
polling a plurality of sources to determine a backlog of each polled source and an estimated drain time for each determined backlog; and
comparing an estimated drain time to a predetermined drain time limit;
as a function of said comparison, selectively switching from said first mode to a second mode of operation;
wherein said second mode includes:
forming a consistency group; and
updating a second data structure instead of said first data structure to indicate additional segments of data to be transferred between the source and destination of a consistency group being formed;
upon successful formation of a consistency group in said second mode, switching operations from said second mode to a third mode of operation;
wherein said third mode includes:
updating said first data structure to indicate additional segments of data to be transferred between the sources and destinations;
wherein said third mode further comprises determining to form a consistency group; and
switching operations from said third mode to a fourth mode of operation;
wherein said fourth mode includes:
forming a consistency group;
updating a second data structure instead of said first data structure to indicate additional segments of data to be transferred between the source and destination of a consistency group being formed;
upon expiration of a maximum consistency group drain time limit, switching operations from said fourth mode of operation to said first mode of operation to resume polling of said sources; and
upon successful formation of a consistency group in said fourth mode, switching operations from said fourth mode to said third mode of operation.

2. The method of claim 1 wherein said comparing includes identifying a most congested source and comparing the estimated drain time of the most congested source to the predetermined drain time limit; and wherein said selective switching includes switching from said first mode to said second mode if the estimated drain time of the most congested source is one of 1) less than or equal to the predetermined drain time limit, and 2) within a predetermined range of the predetermined drain time limit.

3. The method of claim 2 wherein each source is a node and said polling includes querying a node at least two times spaced by a predetermined interval of time to determine a drain rate for a queried node as a function of the change in backlog between queries for a particular node and said interval of time; and wherein said most congested node is determined as a function of the node having the greatest ratio of backlog to drain rate.

4. The method of claim 1 wherein said polling is performed periodically during said first mode of operation; and wherein said method further comprises timing the duration of operation in said first mode and upon expiration of a predetermined polling time limit, switching from said first mode to said second mode to form a consistency group.

5. The method of claim 1 wherein said first data structure is a bit map wherein each bit represents a track to be transferred from a source volume to a destination volume toward creating said consistency group in said second mode, and wherein said updating said first data structure to indicate a transfer of a segment of data toward creation of said consistency group, includes clearing a bit representing the track which was transferred toward the creation of said consistency group;

wherein said second data structure is a bit map wherein each bit represents a track to be transferred from a source volume to a destination volume of said consistency group and wherein said updating said second data structure to indicate additional segments of data to be transferred between the sources and destinations of said consistency group includes setting a bit to indicate a track to be transferred from a source volume to a destination volume of said consistency group;

wherein said updating said first data structure to indicate additional segments of data to be transferred between the sources and destinations of said consistency group includes setting a bit to indicate a track to be transferred from a source volume to a destination volume of said consistency group; and wherein the sources of the consistency group being created are volumes maintained by a plurality of servers and wherein said backlog determining includes determining at least one backlog for each server for data segments remaining to be transferred from the associated server.

6. A method for deploying computing instructions, comprising:

integrating computer-readable code into a storage controller, wherein the storage controller has a memory adapted to maintain first and second data structures and wherein the storage controller is adapted to manage at least one storage unit comprising a plurality of sources, and wherein the storage controller is adapted to be in communication with a remote storage which comprises a plurality of destinations, wherein the code in combination with controller is enabled to cause the controller to perform:

transferring segments of data identified in said first data structure, from a source of said plurality of sources to a destination of said plurality of destinations;

updating said first data structure to indicate a transfer of a segment of data; and in a first mode of operation:

updating said first data structure to indicate additional segments of data to be transferred between the sources and destinations;

polling a plurality of sources to determine a backlog of each polled source and an estimated drain time for each determined backlog; and comparing an estimated drain time to a predetermined drain time limit;

as a function of said comparison, selectively switching from said first mode to a second mode of operation;

wherein said second mode includes:

forming a consistency group; and updating a second data structure instead of said first data structure to indicate additional segments of data to be transferred between the source and destination of a consistency group being formed;

upon successful formation of a consistency group in said second mode, switching operations from said second mode to a third mode of operation;

wherein said third mode includes:

updating said first data structure to indicate additional segments of data to be transferred between the sources and destinations;

wherein said third mode further comprises determining to form a consistency group; and switching operations from said third mode to a fourth mode of operation;

wherein said fourth mode includes:

forming a consistency group;

updating a second data structure instead of said first data structure to indicate additional segments of data to be transferred between the source and destination of a consistency group being formed;

upon expiration of a maximum consistency group drain time limit, switching operations from said fourth mode of operation to said first mode of operation to resume polling of said sources; and upon successful formation of a consistency group in said fourth mode, switching operations from said fourth mode to said third mode of operation.

7. The method of claim 6 wherein said comparing includes identifying a most congested source and comparing the estimated drain time of the most congested source to the predetermined drain time limit; and wherein said selective switching includes switching from said first mode to said second mode if the estimated drain time of the most congested source is one of 1) less than or equal to the predetermined drain time limit, and 2) within a predetermined range of the predetermined drain time limit.

8. The method of claim 7 wherein each source is a node and said polling includes querying a node at least two times spaced by a predetermined interval of time to determine a drain rate for a queried node as a function of the change in backlog between queries for a particular node and said interval of time; and wherein said most congested node is determined as a function of the node having the greatest ratio of backlog to drain rate.

9. The method of claim 7 wherein said first data structure is a bit map wherein each bit represents a track to be transferred from a source volume to a destination volume toward creating said consistency group in said second mode, and wherein said updating said first data structure to indicate a transfer of a segment of data toward creation of said consistency group, includes clearing a bit representing the track which was transferred toward the creation of said consistency group;

wherein said second data structure is a bit map wherein each bit represents a track to be transferred from a source volume to a destination volume of said consistency group and wherein said updating said second data structure to indicate additional segments of data to be transferred between the sources and destinations of said consistency group includes setting a bit to indicate a track to be transferred from a source volume to a destination volume of said consistency group;

wherein said updating said first data structure to indicate additional segments of data to be transferred between the sources and destinations of said consistency group includes setting a bit to indicate a track to be transferred from a source volume to a destination volume of said consistency group; and wherein the sources of the consistency group being created are volumes maintained by a plurality of servers and wherein said backlog determining includes determining at least one backlog for each server for data segments remaining to be transferred from the associated server.

10. The method of claim 6 wherein said polling is performed periodically during said first mode of operation; and wherein said method further comprises timing the duration of operation in said first mode and upon expiration of a predetermined polling time limit, switching from said first mode to said second mode to form a consistency group.

11. A storage controller adapted to manage at least one storage unit comprising a plurality of sources, and adapted to be in communication with a remote storage which comprises a plurality of destinations, comprising:

a memory adapted to maintain first and second data structures; and a processor adapted to:

transfer segments of data identified in said first data structure, from a source of said plurality of sources to a destination of said plurality of destinations;

update said first data structure to indicate a transfer of a segment of data; and in a first mode of operation:

update said first data structure to indicate additional segments of data to be transferred between the sources and destinations;

poll a plurality of sources to determine a backlog of each polled source and an estimated drain time for each determined backlog; and compare an estimated drain time to a predetermined drain time limit;

as a function of said comparison, selectively switch from said first mode to a second mode of operation;

wherein said second mode includes:

forming a consistency group; and updating a second data structure instead of said first data structure to indicate additional segments of data to be transferred between the source and destination of a consistency group being formed;

upon successful formation of a consistency group in said second mode, switching operations from said second mode to a third mode of operation;

wherein said third mode includes:

updating said first data structure to indicate additional segments of data to be transferred between the sources and destinations;

wherein said third mode further comprises determining to form a consistency group; and switching operations from said third mode to a fourth mode of operation;

wherein said fourth mode includes:

forming a consistency group;

updating a second data structure instead of said first data structure to indicate additional segments of data to be transferred between the source and destination of a consistency group being formed;

upon expiration of a maximum consistency group drain time limit, switching operations from said fourth mode of operation to said first mode of operation to resume polling of said sources; and upon successful formation of a consistency group in said fourth mode, switching operations from said fourth mode to said third mode of operation.

12. The storage controller of claim 11 wherein said comparing includes identifying a most congested source and comparing the estimated drain time of the most congested source to the predetermined drain time limit; and wherein said selective switching includes switching from said first mode to said second mode if the estimated drain time of the most congested source is one of 1) less than or equal to the predetermined drain time limit, and 2) within a predetermined range of the predetermined drain time limit.

13. The storage controller of claim 12 wherein said sources include a plurality of nodes and said polling includes querying a node at least two times spaced by a predetermined interval of time to determine a drain rate for a queried node as a function of the change in backlog between queries for a particular node and said interval of time; and wherein said most congested node is determined as a function of the node having the greatest ratio of backlog to drain rate.

14. The storage controller of claim 11 wherein said polling is performed periodically during said first mode of operation; and wherein said processor is further adapted to time the duration of operation in said first mode and upon expiration of a predetermined polling time limit, switch from said first mode to said second mode to form a consistency group.

15. The storage controller of claim 11 wherein said first data structure is a bit map wherein each bit represents a track to be transferred from a source volume to a destination volume toward creating said consistency group in said second mode, and wherein said updating said first data structure to indicate a transfer of a segment of data toward creation of said consistency group, includes clearing a bit representing the track which was transferred toward the creation of said consistency group;

wherein said second data structure is a bit map wherein each bit represents a track to be transferred from a source volume to a destination volume of said consistency group and wherein said updating said second data structure to indicate additional segments of data to be transferred between the sources and destinations of said consistency group includes setting a bit to indicate a track to be transferred from a source volume to a destination volume of said consistency group;

wherein said updating said first data structure to indicate additional segments of data to be transferred between the sources and destinations of said consistency group includes setting a bit to indicate a track to be transferred from a source volume to a destination volume of said consistency group; and wherein the sources of the consistency group being created are volumes maintained by a plurality of servers and wherein said backlog determining includes determining at least one backlog for each server for data segments remaining to be transferred from the associated server.

16. An article of manufacture comprising at least one of a hardware device having logic and a computer readable storage medium having code, enabled by a processor of a storage controller to perform operations, wherein the storage controller has a memory adapted to maintain first and second data structures and wherein the storage controller is adapted to manage at least one storage unit comprising a plurality of sources, and wherein the storage controller is adapted to be in communication with a remote storage which comprises a plurality of destinations, and wherein the operations comprise:

transferring segments of data identified in said first data structure, from a source of said plurality of sources to a destination of said plurality of destinations;

updating said first data structure to indicate a transfer of a segment of data; and in a first mode of operation:

updating said first data structure to indicate additional segments of data to be transferred between the sources and destinations;

polling a plurality of sources to determine a backlog of each polled source and an estimated drain time for each determined backlog; and comparing an estimated drain time to a predetermined drain time limit;

as a function of said comparison, selectively switching from said first mode to a second mode of operation;

wherein said second mode includes:

forming a consistency group; and updating a second data structure instead of said first data structure to indicate additional segments of data to be transferred between the source and destination of a consistency group being formed;

upon successful formation of a consistency group in said second mode, switching operations from said second mode to a third mode of operation;

wherein said third mode includes:

updating said first data structure to indicate additional segments of data to be transferred between the sources and destinations;

wherein said third mode further comprises determining to form a consistency group; and switching operations from said third mode to a fourth mode of operation;

wherein said fourth mode includes:

forming a consistency group;

updating a second data structure instead of said first data structure to indicate additional segments of data to be transferred between the source and destination of a consistency group being formed;

upon expiration of a maximum consistency group drain time limit, switching operations from said fourth mode of operation to said first mode of operation to resume polling of said sources; and upon successful formation of a consistency group in said fourth mode, switching operations from said fourth mode to said third mode of operation.

17. The article of claim 16 wherein said comparing includes identifying a most congested source and comparing the estimated drain time of the most congested source to the predetermined drain time limit; and wherein said selective switching includes switching from said first mode to said second mode if the estimated drain time of the most congested source is one of 1) less than or equal to the predetermined drain time limit, and 2) within a predetermined range of the predetermined drain time limit.

18. The article of claim 17 wherein said sources include a plurality of nodes and said polling includes querying a node at least two times spaced by a predetermined interval of time to determine a drain rate for a queried node as a function of the change in backlog between queries for a particular node and said interval of time; and wherein said most congested node is determined as a function of the node having the greatest ratio of backlog to drain rate.

19. The article of claim 16 wherein said polling is performed periodically during said first mode of operation; and wherein said processor is further adapted to time the duration of operation in said first mode and upon expiration of a predetermined polling time limit, switch from said first mode to said second mode to form a consistency group.

20. The article of claim 16 wherein said first data structure is a bit map wherein each bit represents a track to be transferred from a source volume to a destination volume toward creating said consistency group in said second mode, and wherein said updating said first data structure to indicate a transfer of a segment of data toward creation of said consistency group, includes clearing a bit representing the track which was transferred toward the creation of said consistency group;

wherein said second data structure is a bit map wherein each bit represents a track to be transferred from a source volume to a destination volume of said consistency group and wherein said updating said second data structure to indicate additional segments of data to be transferred between the sources and destinations of said consistency group includes setting a bit to indicate a track to be transferred from a source volume to a destination volume of said consistency group;

wherein said updating said first data structure to indicate additional segments of data to be transferred between the sources and destinations of said consistency group includes setting a bit to indicate a track to be transferred from a source volume to a destination volume of said consistency group; and wherein the sources of the consistency group being created are volumes maintained by a plurality of servers and wherein said backlog determining includes determining at least one backlog for each server for data segments remaining to be transferred from the associated server.

* * * * *